United States Patent
Yuan et al.

(10) Patent No.: US 12,108,211 B2
(45) Date of Patent: Oct. 1, 2024

(54) SOUND RECEIVING DEVICE AND CONTROL METHOD OF SOUND RECEIVING DEVICE

(71) Applicant: Chicony Electronics Co., Ltd., New Taipei (TW)

(72) Inventors: Shang-Yuan Yuan, New Taipei (TW); Hung-Bin Huang, New Taipei (TW)

(73) Assignee: Chicony Electronics Co., Ltd., New Taipei (TW)

(*) Notice: Subject to any disclaimer, the term of this patent is extended or adjusted under 35 U.S.C. 154(b) by 268 days.

(21) Appl. No.: 17/746,983

(22) Filed: May 18, 2022

(65) Prior Publication Data

US 2023/0292041 A1 Sep. 14, 2023

(30) Foreign Application Priority Data

Mar. 11, 2022 (TW) .................. 111108967

(51) Int. Cl.
*H04R 1/40* (2006.01)
*G01S 13/52* (2006.01)
*G10L 19/008* (2013.01)

(52) U.S. Cl.
CPC .............. *H04R 1/406* (2013.01); *G01S 13/52* (2013.01); *G10L 19/008* (2013.01)

(58) Field of Classification Search
CPC ......... H04R 1/406; G01S 13/52; G01S 13/04; G10L 19/008
USPC ........................... 381/92, 26, 56, 91, 95, 122
See application file for complete search history.

(56) References Cited

U.S. PATENT DOCUMENTS

| | | | |
|---|---|---|---|
| 2006/0165242 A1* | 7/2006 | Miki ..................... | H04R 3/005 381/59 |
| 2015/0208171 A1* | 7/2015 | Funakoshi ............. | H04N 5/602 381/26 |
| 2019/0280664 A1* | 9/2019 | Kawauchi ............... | G08G 1/16 |

FOREIGN PATENT DOCUMENTS

CN 111161751 5/2020

OTHER PUBLICATIONS

"Office Action of Taiwan Counterpart Application", issued on Apr. 24, 2024, p. 1-p. 7.

* cited by examiner

*Primary Examiner* — Thjuan K Addy
(74) *Attorney, Agent, or Firm* — JCIPRNET

(57) ABSTRACT

A sound receiving device and a control method of the sound receiving device are described. The sound receiving device includes a microphone apparatus, an object detection apparatus, and a processor. The microphone apparatus provides an audio signal. The object detection apparatus detects position information of at least one object. The processor is coupled to the microphone apparatus and the object detection apparatus. The processor determines position information of a sound source according to the audio signal and the position information of the at least one object, and adjusts each microphone gain in the microphone apparatus to receive sound from the sound source.

15 Claims, 8 Drawing Sheets

SOUND RECEIVING DEVICE AND CONTROL METHOD OF SOUND RECEIVING DEVICE

CROSS-REFERENCE TO RELATED APPLICATION

This application claims the priority benefit of Taiwan application serial no. 111108967, filed on Mar. 11, 2022. The entirety of the above-mentioned patent application is hereby incorporated by reference herein and made a part of this specification.

BACKGROUND

Technical Field

The disclosure relates to a sound receiving technology, and in particular, to a sound receiving device and a control method of the sound receiving device.

Description of Related Art

In video conferencing or sound receiving technology in related situations, it is hoped that the speaker's voice can be accurately received through the microphone, and other environmental noises can be eliminated. However, if a sound source is simply determined by the acoustic wave sound receiving technology, the direction and the distance of the sound source are often determined inaccurately due to reflection or scattering of acoustic waves or other noise sources, and quickly identifying the sound source is not easy.

Therefore, it is necessary to provide a new sound receiving technology that may accurately receive sound from sound sources.

SUMMARY

The disclosure provides a sound receiving device and a control method of the sound receiving device, which utilize the acoustic wave sound receiving technology combined with the object detection technology to accurately receive sound.

The embodiment of the disclosure provides a sound receiving device. The sound receiving device includes a microphone apparatus, an object detection apparatus, and a processor. The microphone apparatus is configured to provide an audio signal. The object detection apparatus is configured to detect position information of at least one object. The processor is coupled to the microphone apparatus and the object detection apparatus. The processor determines position information of a sound source according to the audio signal and the position information of the at least one object, and adjusts each microphone gain in the microphone apparatus to receive sound from the sound source.

The embodiment of the disclosure further provides a control method of the sound receiving device. The control method includes the following steps: an audio signal is obtained according to a microphone apparatus; position information of at least one object is detected according to an object detection apparatus; position information of a sound source is determined according to the audio signal and the position information of the at least one object; and each microphone gain in the microphone apparatus is adjusted to receive sound from the sound source.

Based on the above, the sound receiving device and the control method of the sound receiving device described in the embodiments of the disclosure first use the acoustic wave sound receiving technology combined with the object detection technology (e.g., a radar sensor, a camera, or an optical radar sensor) to comprehensively determine the coordinates of the sound source. Next, the sound receiving device selectively adjusts the corresponding gain of the respective microphones configured to receive sound, for example, enhancing the microphone gain for the sound source and lowering the microphone gain for the non-sound source, so as to accurately receive sound.

DESCRIPTION OF THE EMBODIMENTS

Figure 1:
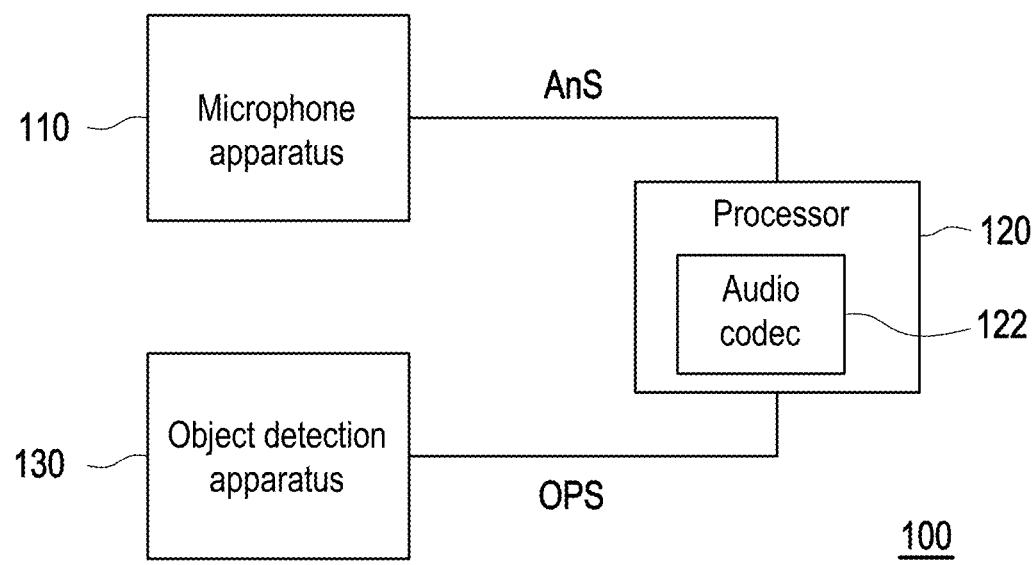
FIG. 1 is a device block diagram of a sound receiving device according to an embodiment of the disclosure.

FIG. 1 is a device block diagram of a sound receiving device 100 according to an embodiment of the disclosure. The sound receiving device 100 mainly includes a microphone apparatus 110, an object detection apparatus 130, and a processor 120.

The microphone apparatus 110 is configured to capture audio to provide an audio signal AnS. The microphone apparatus 110 of the embodiment may be composed of multiple directional microphones (as described in a first embodiment of the disclosure), may be implemented by a single omnidirectional microphone (as described in a second embodiment of the disclosure), or may be composed of one or more directional microphones and omnidirectional microphones. Those applying the embodiment may use different microphone types to form the microphone apparatus 110 according their needs, and accurately receive sound may according to the description of various embodiments of the disclosure.

The object detection apparatus 130 is configured to detect position information of at least one object in an object detection area to generate an object position signal OPS. The microphone apparatus 110 of the embodiment also receives sound in the object detection area. The object detection apparatus 130 of the embodiment may be a radar sensor, a camera, an optical radar sensor, etc., or a corresponding apparatus that may detect the position information of a physical object but is not an acoustic wave sensing apparatus.

The processor 120 is coupled to the microphone apparatus 110 and the object detection apparatus 130. The processor 120 determines the position information of the sound source according to the audio signal Ans provided by the microphone apparatus 110 and the position information of the object provided by the object detection apparatus 130. That is, the processor 120 determines the preliminary position of the sound source through the audio signal captured by the microphone apparatus 110 and the corresponding acoustic wave object detection technology, and combines the position information of the object provided by the aforementioned object detection apparatus 130 to further determine the accurate position information of the sound source. In addition, the processor 120 determines the distance between the microphone apparatus 110 and the sound source through the accurate position information of the sound source, or whether the position information of the sound source is located in a specific sound receiving area of the microphone apparatus 110, so as to properly adjust each of the microphone gain in the microphone apparatus 110, and accurately receive sound from the sound source.

As for how to properly adjust each of the microphone gain in the microphone apparatus 110 to accurately receive sound, the embodiment makes adaptive adjustments depending on the type and number of microphones in the microphone apparatus 110 and an audio codec 122 used in the processor 120. Those applying the embodiment may properly refer to various embodiments of the disclosure to implement such adjustments. The audio codec 122 may be stored in the processor 120 or in a memory coupled to the processor 120, and the audio codec 122 is executed by the processor 120. The audio codec 122 may be in the form of software or firmware.

Figure 2:
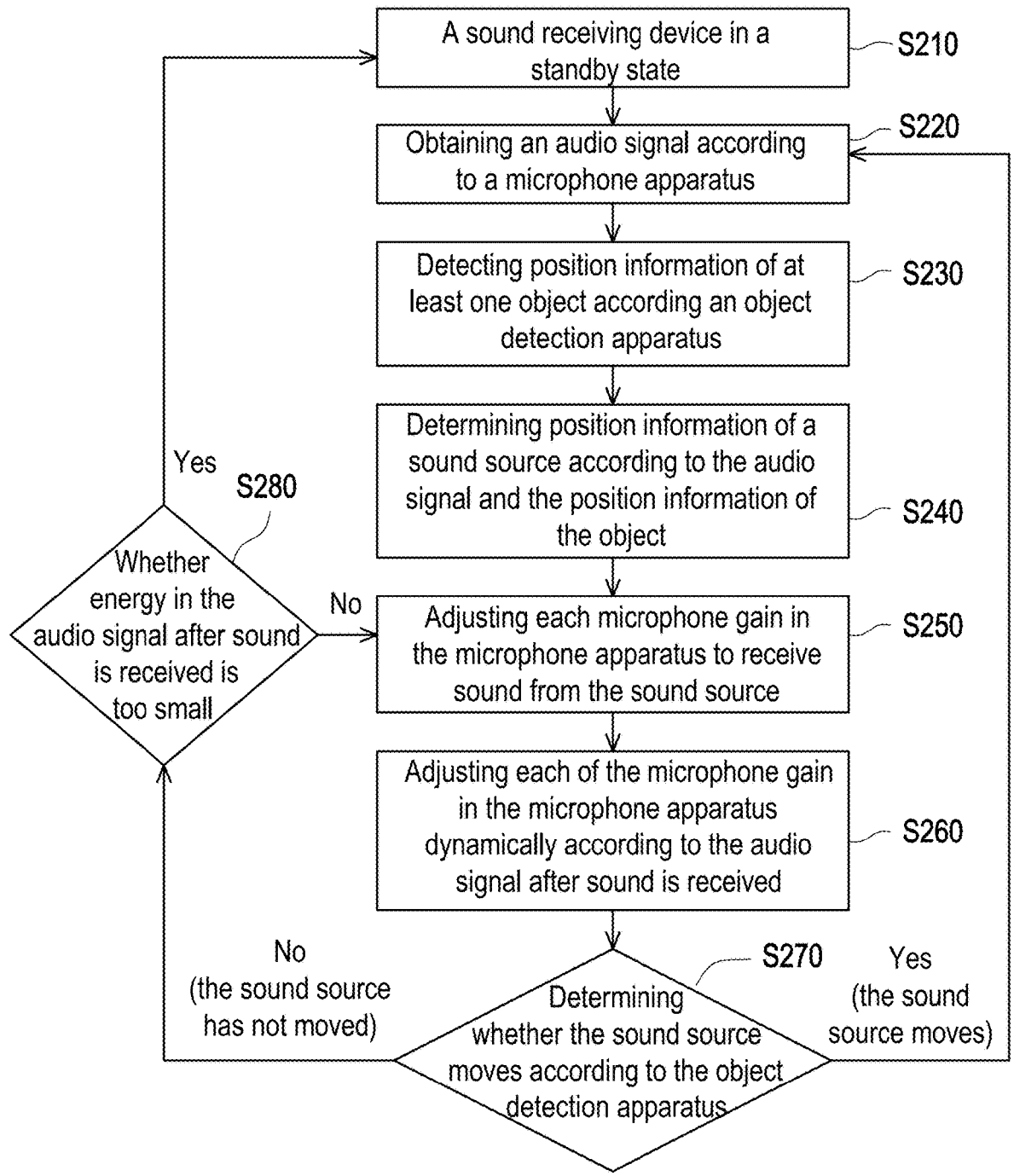
FIG. 2 is a flowchart of a control method of the sound receiving device according to an embodiment of the disclosure.

FIG. 2 is a flowchart of a control method of the sound receiving device 100 according to an embodiment of the disclosure. The control method described in the embodiment may be applied to the sound receiving device 100 in FIG. 1, be consistent with the description of the following FIGS. 3 to 6 of various embodiments of the disclosure, and include steps S210 to S280. Each step in FIG. 2 is described first with a first embodiment including FIG. 3, FIGS. 4A to 4B, and FIGS. 5A to 5B.

Figure 3:
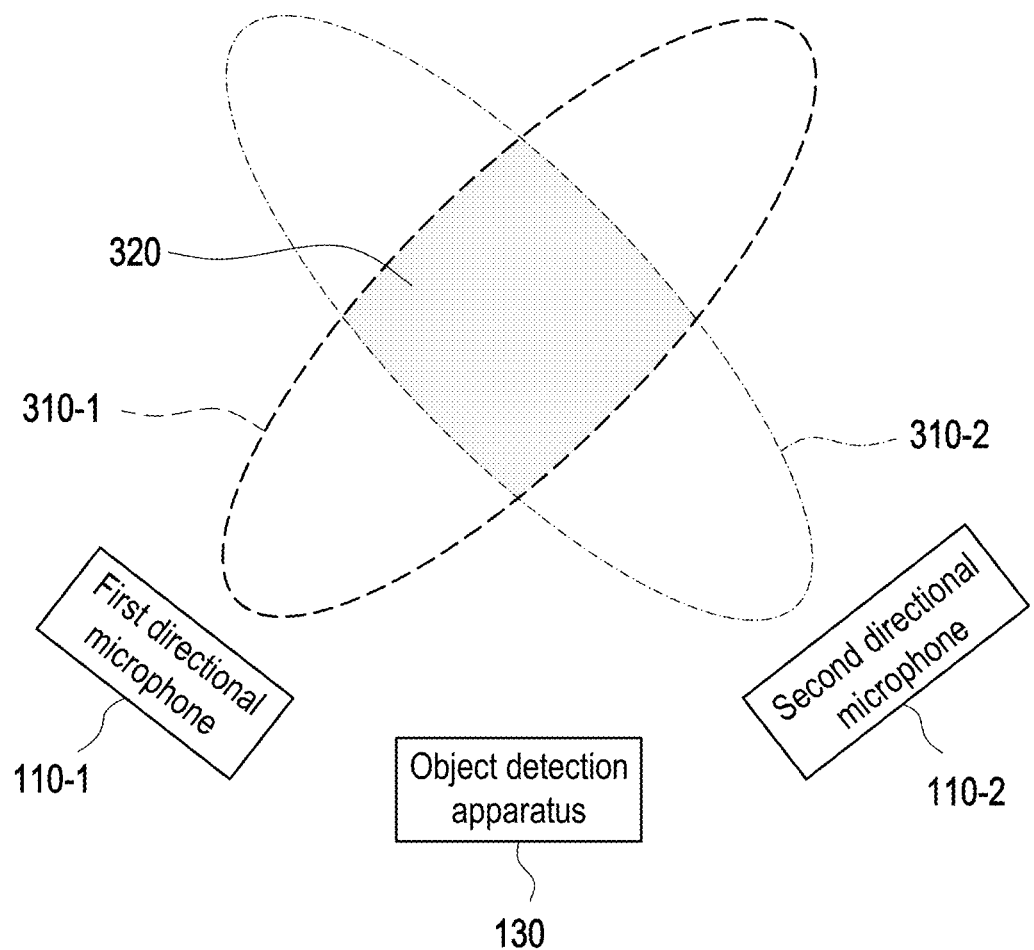
FIG. 3 is a schematic diagram of implementing a microphone apparatus with a first directional microphone and a second directional microphone in a sound receiving device according to a first embodiment of the disclosure.
Figure 4A:
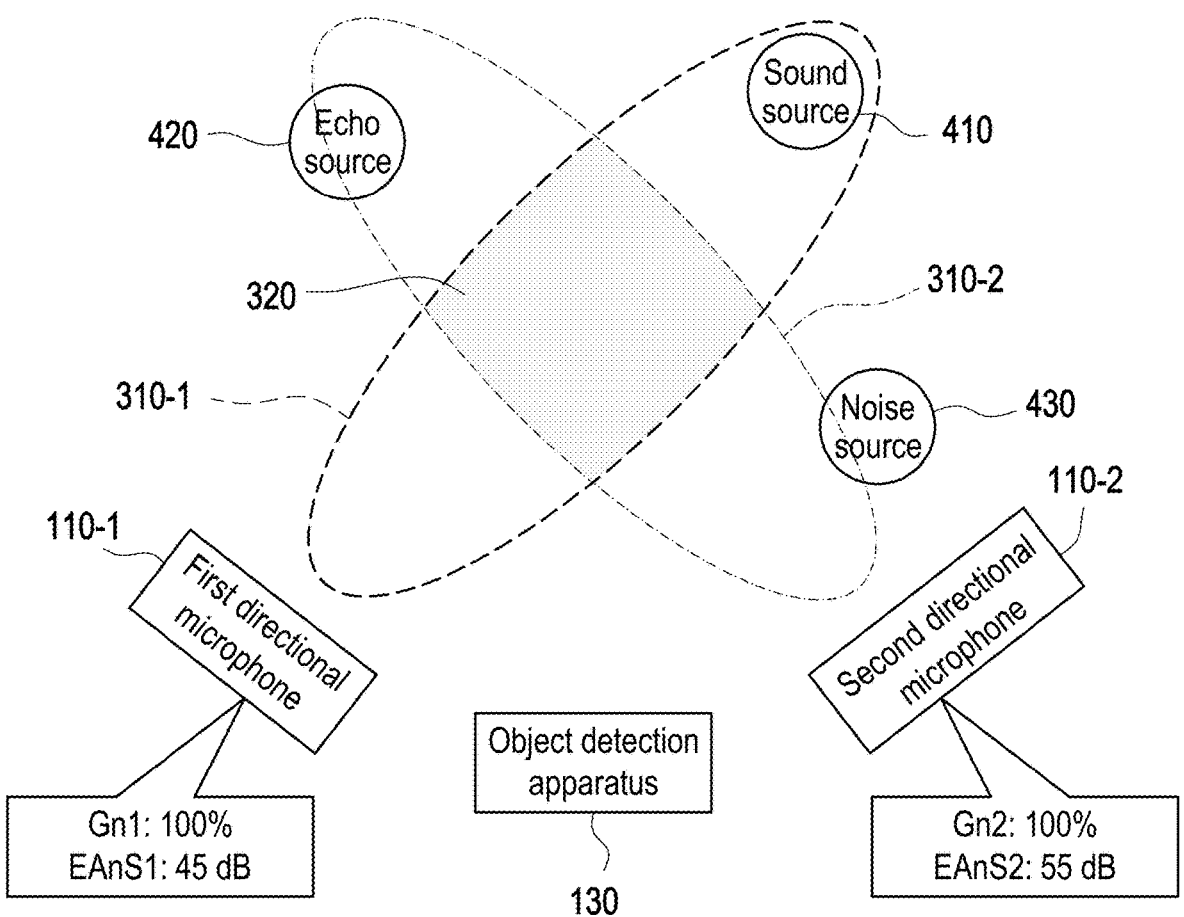
FIGS. 4A, 4B, 5A, and 5B are exemplary schematic diagrams of the sound receiving device of FIG. 3 according to the first embodiment of the disclosure.
Figure 4B:
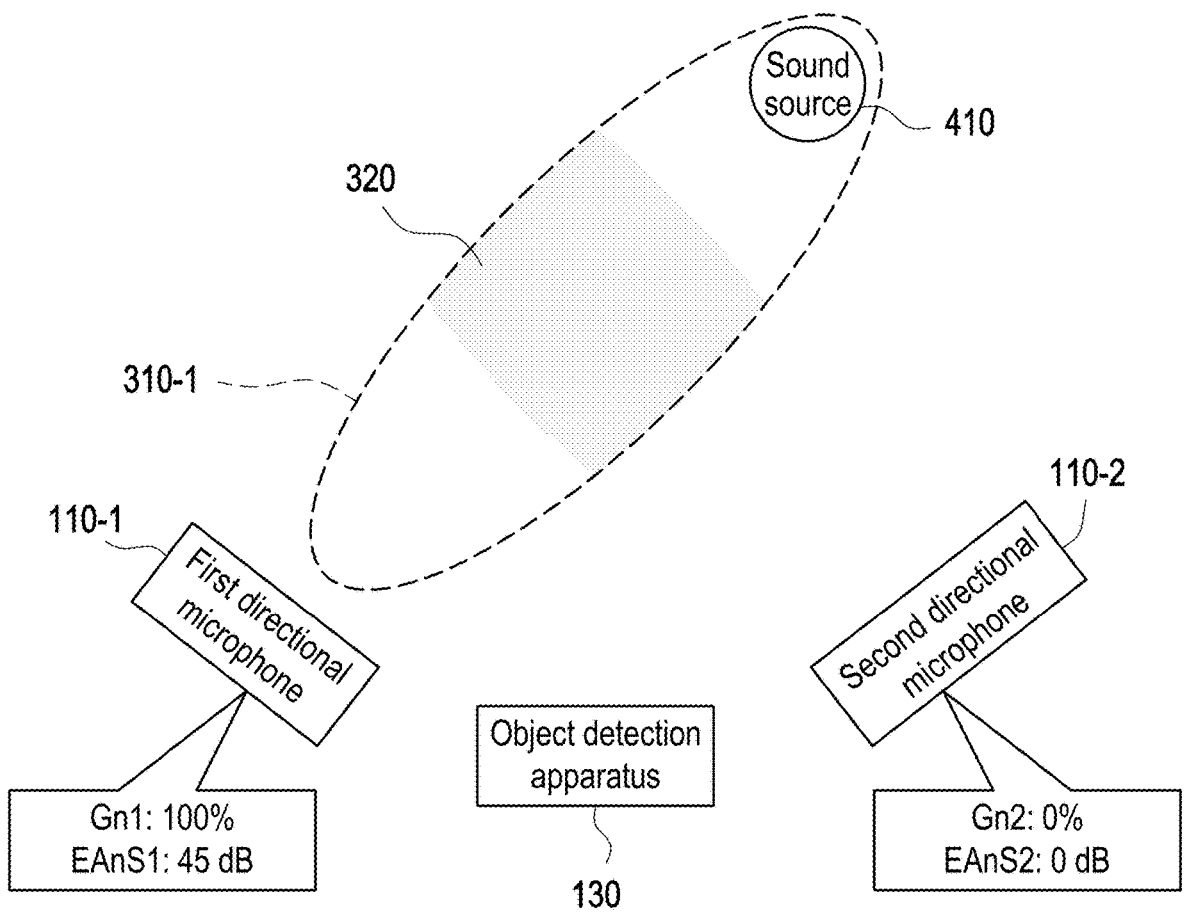
Figure 5A:
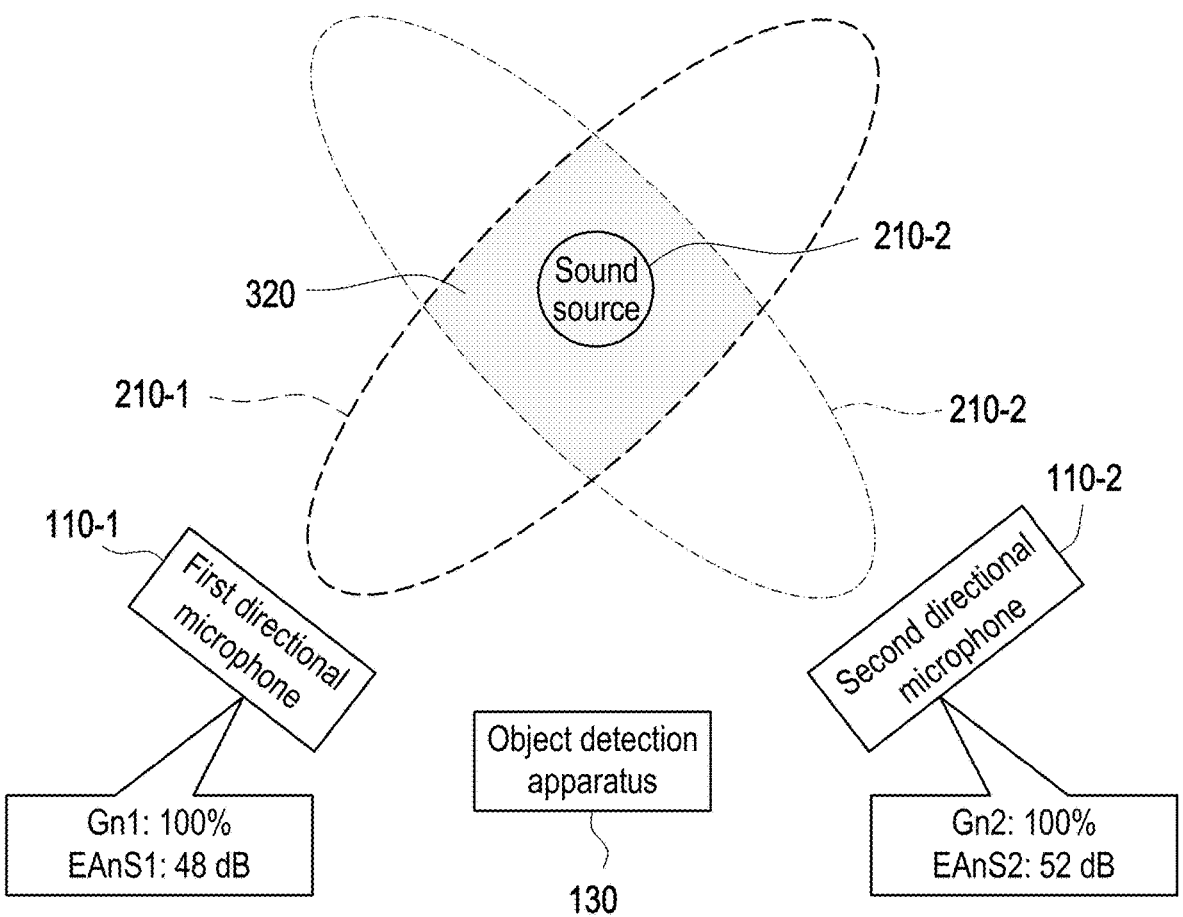
Figure 5B:
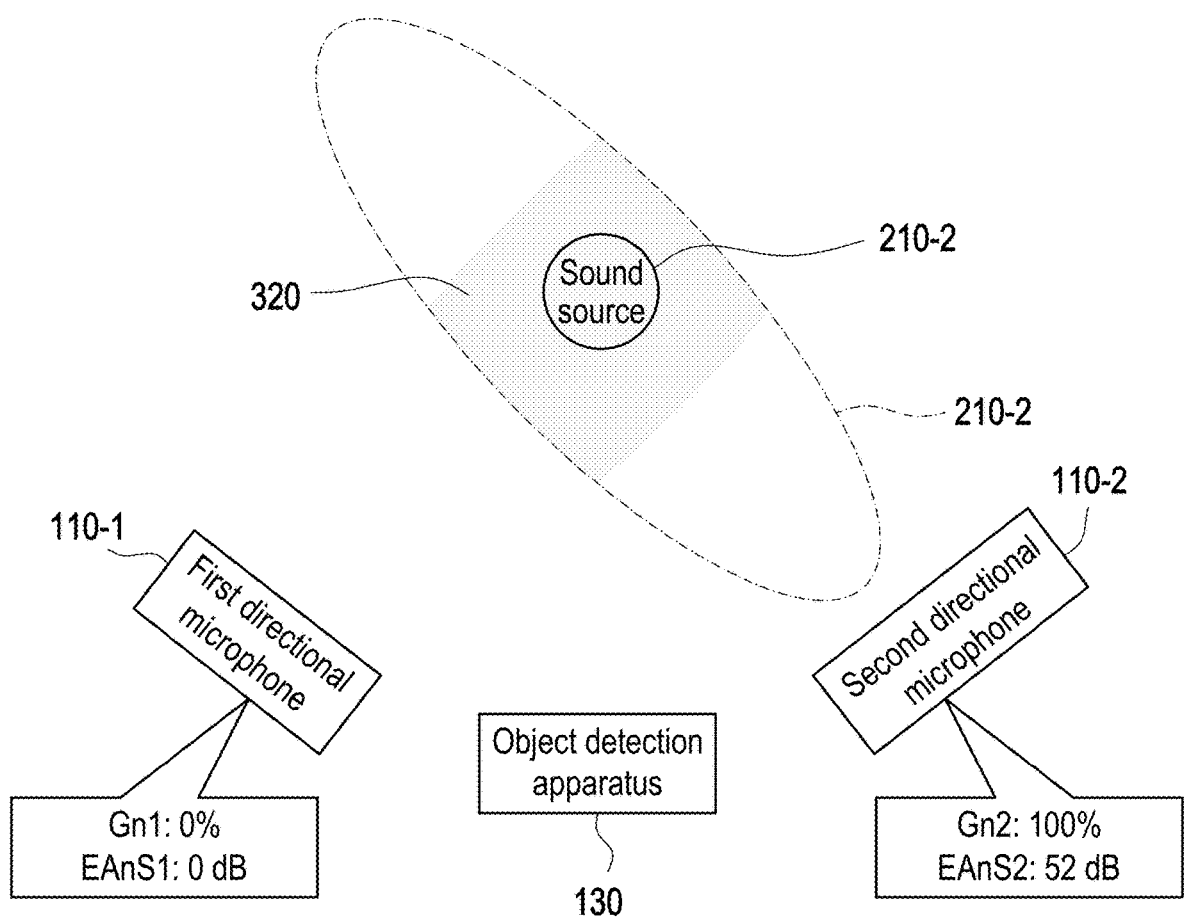

FIG. 3 is a schematic diagram of implementing the microphone apparatus 110 with a first directional microphone 110-1 and a second directional microphone 110-2 in the sound receiving device 100 according to the first embodiment of the disclosure. FIGS. 4A, 4B, 5A, and 5B are exemplary schematic diagrams of the sound receiving device 100 of FIG. 3 according to the first embodiment of the disclosure. FIGS. 4A and 4B are used to show a situation before and after the adjustments of the microphone gain in the microphone apparatus 110 in the first embodiment. FIGS. 5A and 5B are used to show another situation before and after the adjustments of the microphone gain in the microphone apparatus 110 in the first embodiment.

In FIGS. 3, 4A, 4B, 5A, and 5B, the sound receiving device 100 mainly includes the microphone apparatus 110, the object detection apparatus 130, and the processor 120.

In the first embodiment of the disclosure, the microphone apparatus 110 includes the first directional microphone 110-1 and the second directional microphone 110-2. The first directional microphone 110-1 receives sound from a first sound receiving area 310-1 to generate a first audio signal, and the second directional microphone 110-2 receives sound from a second sound receiving area 310-2 to generate a second audio signal. An overlapping area 320 is provided between the first sound receiving area 310-1 and the second sound receiving area 310-2. In other words, the microphone apparatus 110 of the first embodiment uses multiple directional microphones to receive sound from multiple different angles in an oblique manner.

Microphone gain Gn1 and Gn2 in FIGS. 4A, 4B, 5A, and 5B respectively represents the microphone gain configured to receive sound in the first directional microphone 110-1 and the second directional microphone 110-2. Audio energy EAnS1 and EAnS2 respectively represents the audio energy of the first audio signal and the second audio signal captured by the first directional microphone 110-1 and the second directional microphone 110-2.

Refer to FIGS. 2, 4A, and 4B at the same time. In step S210, the processor 120 of FIG. 1 controls the sound receiving device 100 to be in a standby state. At this time, the processor 120 of FIG. 1 sets the microphone gain Gn1 and Gn2 of the directional microphones 110-1 and 110-2 to 100%.

In step S220, the processor 120 of FIG. 1 obtains an audio signal according to the microphone apparatus 110. In the first embodiment, the first directional microphone 110-1 receives sound from the first sound receiving area 310-1 to generate the first audio signal, and the second directional microphone 110-2 receives sound from the second sound receiving area 310-2 to generate the second audio signal. The processor 120 of FIG. 1 receives the aforementioned first audio signal and the second audio signal, respectively. As shown in FIG. 4A, in the first embodiment, it is assumed that the audio energy EAnS1 of the first audio signal is 45 dB, and the audio energy EAnS2 of the second audio signal is 55 dB. In step S230, the processor 120 of FIG. 1 obtains the position information of the at least one object according to the object detection apparatus 130.

In step S240, the processor 120 of FIG. 1 determines the position information of the sound source (e.g., a sound source 410 in FIG. 4A) according to the audio signals (e.g., the first audio signal and the second audio signal) and the position information of the object. In detail, the processor 120 of FIG. 1 determines position information of at least one estimated audio source according to the first audio signal and the second audio signal, and compares the position information of the estimated audio source with the position information of the object to determine the position information of the sound source 410. The processor 120 of the embodiment may obtain the position information of the estimated audio source (e.g., the sound source 410, an echo source 420, or a noise source 430) through the first audio signal and the second audio signal by using the acoustic wave object detection technology. However, the aforementioned estimated audio source is not only the sound source 410, and may cause misdetermination of the estimated audio source due to environmental noises, sound echoes, etc., such as the aforementioned echo source 420, the noise source 430, etc. Therefore, in addition to using the acoustic wave object detection technology to obtain the aforementioned estimated audio source, the embodiment further combines the position information of the object provided by the object detection apparatus 130 to determine the accurate position information of the sound source 410.

It is assumed here that the first embodiment is an office environment located in a remote conference, and the sound source 410 is mainly the user. However, other sound sources, including the echo source 420 (such as an echo area formed by reflection through walls), the noise source 430 (such as an electric fan and the like), etc. may exist in the office environment. These sound sources may be eliminated by comparing the position information of the object provided by the object detection apparatus 130. For example, in an example, the object detection apparatus 130 may be configured to regard a human body as the object detected by the object detection apparatus 130, and an object whose volume is smaller than the normal human body is not regarded as the object detected by the object detection apparatus 130. In another example, the object detection apparatus 130 may also be configured to estimate the width and height of the object by using the radar reflection information, so as to exclude an object smaller than a preset height or a preset width. In this way, the position information of the sound source 410 may be obtained effectively and accurately.

In step S250, the processor 120 of FIG. 1 adjusts each of the microphone gain in the microphone apparatus 110 to receive sound from the sound source 410. In the first embodiment, the processor 120 of FIG. 1 determines the relationship between the position information of the sound source 410, the first sound receiving area 310-1, the second sound receiving area 310-2, and the overlapping area 320 to adjust the microphone gain Gn1 of the first directional microphone 110-1 and the microphone gain Gn2 of the second directional microphone 110-2.

In detail, when the position information of the sound source 410 is determined to be located in one of the first sound receiving area 310-1 and the second sound receiving area 310-2 (in the embodiment, the position information of the sound source 410 in FIG. 4A is located in the first sound receiving area 310-1) and not to be located in the other of the first sound receiving area 310-1 and the second sound receiving area 310-2 (in the embodiment, it refers to the second sound receiving area 310-2), the processor 120 of FIG. 1 increases or maintains the microphone gain Gn1 (in the embodiment, the microphone gain Gn1 is maintained at 100%, as shown in FIG. 4B) of the first directional microphone 110-1 corresponding to one of the first sound receiving area 310-1 and the second sound receiving area 310-2 (in the embodiment, it refers to the first sound receiving area 310-1), and lowers the microphone gain Gn2 (in the embodiment, the microphone gain Gn2 is lowered to 0%, as shown in FIG. 4B) of the second directional microphone 110-2 corresponding to the other of the first sound receiving area 310-1 and the second sound receiving area 310-2 (in the embodiment, it refers to the second sound receiving area 310-2).

In other embodiments consistent with the disclosure, if it is assumed that the position information of the sound source is determined to be located in the second sound receiving area 310-2 and not to be located in the first sound receiving area 310-1, the processor 120 of FIG. 1 increases or maintains the microphone gain of the second directional microphone corresponding to the second sound receiving area 310-2, and lowers the microphone gain of the first directional microphone corresponding to the first sound receiving area 310-1.

FIG. 4B is a schematic diagram of the respective microphone gain of the first directional microphone 110-1 and the second directional microphone 110-2 after being adjusted in step S250 in FIG. 4A. As shown in FIG. 4B, the microphone gain Gn1 is maintained at 100%. Moreover, since the microphone gain Gn2 is lowered to 0%, the audio energy EAnS2 of the second audio signal captured by the second directional microphone 110-2 is 0 dB. In other embodiments consistent with the disclosure, the unadjusted microphone gain Gn1 and Gn2 in FIG. 4A may be 90% and 90%, respectively, and the adjusted microphone gain Gn1 and Gn2 in FIG. 4B may be 100% and 10%, respectively, so that the microphone gain Gn1 is increased from 90% to 100%, and the microphone gain Gn2 is lowered from 90% to 10%. The microphone gain Gn1 and Gn2 in FIGS. 4A and 4B may be adjusted correspondingly according to the requirements of those applying the embodiment. In this way, the processor 120 of FIG. 1 may use the acoustic wave sound receiving technology in combination with the object detection technology to accurately receive sound.

In step S260, the processor 120 of FIG. 1 dynamically adjusts each of the microphone gain in the microphone apparatus 110 according to the audio signal after the microphone apparatus 110 receives sound, so as to obtain a better sound receiving effect dynamically and automatically. The corresponding steps of "dynamically adjusting the microphone gain" in step S260 are the same as or similar to the aforementioned step S250, and the corresponding steps described in FIGS. 4A and 4B. Those applying the embodiment may dynamically adjust each of the microphone gain in the microphone apparatus 110 according to their needs and the aforementioned description.

In step S270, the processor 120 of FIG. 1 determines whether the sound source 410 moves according to the object detection apparatus 130. In detail, after confirming the position information of the sound source 410, the processor 120 still continues to detect whether the sound source 410 moves through the object detection apparatus 130. If the processor 120 in FIG. 1 determines, through the object detection apparatus 130, that the moving distance of the sound source 410 exceeds a preset threshold, it means that the sound source 410 is moving. Therefore, the process returns to step S220 from step S270 to re-confirm the position information of the sound source 410 to automatically and accurately receive sound. In contrast, if the processor 120 of FIG. 1 determines, through the object detection apparatus 130, that the moving distance of the sound source 410 does not exceed the preset threshold, it means that the sound source 410 has not moved. Thus, the process proceeds from step S270 to step S280.

In step S280, the processor 120 of FIG. 1 determines whether the energy in the audio signal after sound is received is too small, for example, whether the energy in the audio signal after sound is received is less than a preset energy value. If the energy in the audio signal after sound is received is not too small (not less than the preset energy value), it means that the sound source 410 has not moved and continues to emit sound. Therefore, the process returns to step S250 from step S270 to continue to receive sound and dynamically obtain a better sound receiving effect. In contrast, if the energy in the audio signal after sound is received is too small, it means that the sound source 410 does not continue to emit sound. Thus, the process returns to step S210 from step S270, so that the sound receiving device 100 returns to the standby state until the sound source 410 is detected in step S220, and the process proceeds the corresponding steps in FIG. 2.

Refer to step S250 of FIG. 2 and FIGS. 5A and 5B at the same time. When the position information of the sound source 410 is determined to be located in the overlapping area 320 of FIG. 5A, the processor 120 of FIG. 1 determines which of the audio signals has larger audio energy between the first audio signal received by the first directional microphone 110-1 and the second audio signal received by the second directional microphone 110-2. It is assumed that the audio energy EAnS1 (48 dB) of the first audio signal is smaller than the audio energy EAnS2 (52 dB) of the second audio signal, so it means that the audio energy in the second audio signal is larger. Therefore, as shown in FIG. 5B, the processor 120 of FIG. 1 increases or maintains the microphone gain of the second directional microphone 110-2 corresponding to the second audio signal (e.g., maintaining the microphone gain Gn2 at 100%), and lowers the microphone gain of the first directional microphone 110-1 corresponding to the first audio signal (e.g., lowering the microphone gain Gn1 to 0%).

In other embodiments consistent with the disclosure, it is assumed that the audio energy in the first audio signal is larger. Therefore, the processor 120 of FIG. 1 increases or maintains the microphone gain of the first directional microphone 110-1 corresponding to the first audio signal, and lowers the microphone gain of the second directional microphone 110-2 corresponding to the second audio signal.

The above-mentioned first embodiment uses multiple directional microphones to form the microphone apparatus 110 to implement the embodiment of the disclosure. Here, another embodiment (the second embodiment) is proposed to implement the microphone apparatus 110 with an omnidirectional microphone, and the audio codec 122 of FIG. 1 is used to perform the control method of FIG. 2.

Figure 6:
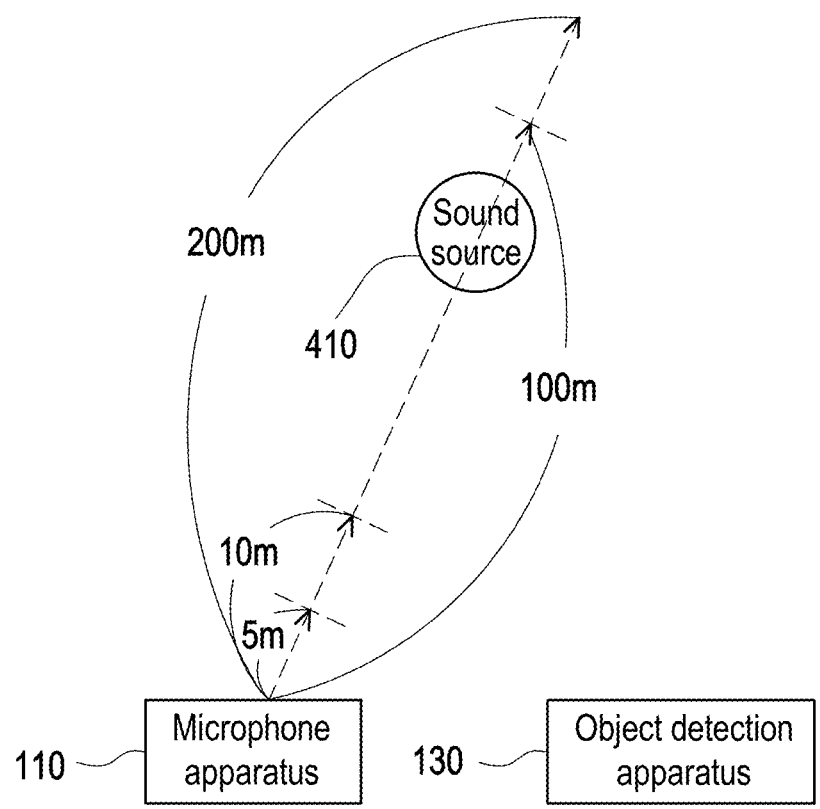
FIG. 6 is a schematic diagram of implementing a microphone apparatus with an omnidirectional microphone in a sound receiving device according to a second embodiment of the disclosure.

FIG. 6 is a schematic diagram of implementing the microphone apparatus 110 with the omnidirectional microphone in the sound receiving device 100 according to the second embodiment of the disclosure. In the second embodiment, when executing step S240 of FIG. 2, the processor 120 of FIG. 1 may preliminarily determine which direction the sound source is roughly located through the audio signal AnS of FIG. 1, and combine the position information of the aforementioned object to determine the position information of the sound source.

In the second embodiment, when executing step S250 of FIG. 2, the processor 120 of FIG. 1 executes the audio codec 122. The audio codec 122 uses multiple distances as parameters, thereby adjusting each of the microphone gain in the microphone apparatus 110 and receiving sound. For example, the audio codec 122 uses the distances of 5 meters (5 m), 10 meters (10 m), 100 meters (100 m), and 200 meters (200 m) as parameters to adjust each of the microphone gain in the microphone apparatus 110, thereby obtaining audio signals captured based on four different distances. Moreover, the processor 120 of FIG. 1 executes the audio codec 122 to determine a specific distance based on the audio signals, so as to determine which of the distances obtains the audio signal with the best quality and the highest energy. For example, in FIG. 6, the audio codec 122 sets the specific distance to 100 meters, so as to adjust each of the microphone gain in the microphone apparatus 110 by using the parameter of 100 meters, and accurately receive sound. For the implementation of other steps in FIG. 2 in the second embodiment, refer to the description of the first embodiment.

Those applying the embodiments of the disclosure may also know that the directional microphones in the first embodiment may be combined with the microphone gain adjustment technique of the audio codec 122 using the distances as the parameters in the second embodiment to implement yet another embodiment.

In summary, the sound receiving device and the control method of the sound receiving device described in the embodiments of the disclosure first use the acoustic wave sound receiving technology combined with the object detection technology (e.g., a radar sensor, a camera, or an optical radar sensor) to comprehensively determine the coordinates of the sound source. Next, the sound receiving device selectively adjusts the corresponding gain of the respective microphones configured to receive sound, for example, enhancing the microphone gain for the sound source and lowering the microphone gain for the non-sound source, so as to accurately receive sound.

What is claimed is:

1. A sound receiving device, comprising:
    a microphone apparatus, configured to provide an audio signal;
    an object detection apparatus, configured to detect position information of at least one object, wherein the object detection apparatus is a corresponding apparatus that detect the position information of a physical object rather than an acoustic wave sensing apparatus; and
    a processor, coupled to the microphone apparatus and the object detection apparatus,
    wherein the processor determines position information of a sound source according to the audio signal and the position information of the at least one object, and adjusts each microphone gain in the microphone apparatus to receive sound from the sound source.

2. The sound receiving device according to claim 1, wherein the microphone apparatus comprises:
    a first directional microphone, receiving sound from a first sound receiving area to generate a first audio signal; and
    a second directional microphone, receiving sound from a second sound receiving area to generate a second audio signal, wherein an overlapping area is provided between the first sound receiving area and the second sound receiving area,
    wherein the processor determines position information of at least one estimated audio source according to the first audio signal and the second audio signal, and compares the position information of the at least one estimated audio source with the position information of the at least one object to determine the position information of the sound source.

3. The sound receiving device according to claim 2, wherein the processor determines a relationship between the position information of the sound source, the first sound receiving area, the second sound receiving area, and the overlapping area, so as to adjust a first microphone gain of the first directional microphone and a second microphone gain of the second directional microphone.

4. The sound receiving device according to claim 3, wherein when determining that the position information of the sound source is located in one of the first sound receiving area and the second sound receiving area and is not located in the other of the first sound receiving area and the second sound receiving area, the processor increases or maintains the first microphone gain of the first directional microphone or the second microphone gain of the second directional microphone corresponding to one of the first sound receiving area and the second sound receiving area, and lowers the first microphone gain of the first directional microphone or the second microphone gain of the second directional microphone corresponding to the other of the first sound receiving area and the second sound receiving area.

5. The sound receiving device according to claim 3, wherein when determining that the position information of the sound source is located in the overlapping area, the processor determines which of the audio signals has larger audio energy between the first audio signal received by the first directional microphone and the second audio signal received by the second directional microphone, increases or maintains the first microphone gain of the first directional microphone or the second microphone gain of the second directional microphone corresponding to the first audio signal or the second audio signal with the larger audio energy, and lowers the first microphone gain of the first directional microphone or the second microphone gain of the second directional microphone corresponding to the first audio signal or the second audio signal without the larger audio energy.

6. The sound receiving device according to claim 1, wherein the processor executes an audio codec, the audio codec adjusts each of the microphone gain in the microphone apparatus by using a plurality of distances as parameters and receives sound, and the audio codec determines a specific distance by using a plurality of audio signals after sound is received,
    wherein the processor adjusts each of the microphone gain in the microphone apparatus according to the specific distance.

7. The sound receiving device according to claim 1, wherein the object detection apparatus is a radar detector.

8. The sound receiving device according to claim 1, wherein the processor further dynamically adjusts each of the microphone gain in the microphone apparatus according to the audio signal after the microphone apparatus receives sound.

9. The sound receiving device according to claim 1, wherein the processor further determines whether the sound source moves according to the object detection apparatus,
    when determining that the sound source moves, the processor determines the position information of the sound source, and adjusts each of the microphone gain in the microphone apparatus to receive sound from the sound source,
    when determining that the sound source has not moved, the processor determines whether energy in the audio signal after sound is received is less than a preset energy value,
    when determining that the energy in the audio signal is not less than the preset energy value, the processor continues to dynamically adjust each of the microphone gain in the microphone apparatus,
    when determining that the energy in the audio signal is less than the preset energy value, the processor instructs the sound receiving device to return to a standby state.

10. A control method of the sound receiving device, comprising:
    obtaining an audio signal according to a microphone apparatus;
    detecting position information of at least one object according to an object detection apparatus, wherein the object detection apparatus is a corresponding apparatus that detect the position information of a physical object rather than an acoustic wave sensing apparatus;
    determining position information of a sound source according to the audio signal and the position information of the at least one object; and
    adjusting each microphone gain in the microphone apparatus to receive sound from the sound source.

11. The control method according to claim 10, wherein the microphone apparatus comprises:
    a first directional microphone, receiving sound from a first sound receiving area to generate a first audio signal; and
    a second directional microphone, receiving sound from a second sound receiving area to generate a second audio signal, wherein an overlapping area is provided between the first sound receiving area and the second sound receiving area,
    wherein determining the position information of the sound source according to the audio signal and the position information of the at least one object comprises:
        determining position information of at least one estimated audio source according to the first audio signal and the second audio signal; and
        comparing the position information of the at least one estimated audio source with the position information of the at least one object to determine the position information of the sound source.

12. The control method according to claim 11, wherein adjusting each of the microphone gain in the microphone apparatus to receive sound from the sound source comprises:
    determining a relationship between the position information of the sound source, the first sound receiving area, the second sound receiving area, and the overlapping area, so as to adjust a first microphone gain of the first directional microphone and a second microphone gain of the second directional microphone.

13. The control method according to claim 10, wherein adjusting each of the microphone gain in the microphone apparatus to receive sound from the sound source comprises:
    executing an audio codec, the audio codec adjusting each of the microphone gain in the microphone apparatus by using a plurality of distances as parameters and receiving sound, and the audio codec determining a specific distance by using a plurality of audio signals after sound is received; and
    adjusting each of the microphone gain in the microphone apparatus according to the specific distance.

14. The control method according to claim 10, further comprising:
    adjusting each of the microphone gain in the microphone apparatus dynamically according to the audio signal after the microphone apparatus receives sound.

15. The control method according to claim 10, further comprising:
    determining whether the sound source moves according to the object detection apparatus;
    determining the position information of the sound source when determining that the sound source moves, and adjusting each of the microphone gain in the microphone apparatus to receive sound from the sound source;
    determining whether the energy in the audio signal after sound is received is less than a preset energy value when determining that the sound source has not moved;
    continuing to dynamically adjust each of the microphone gain in the microphone apparatus when determining that the energy in the audio signal is not less than the preset energy value; and
    returning to a standby state when determining that the energy in the audio signal is less than the preset energy value.

* * * * *